(12) United States Patent
Brochot et al.

(10) Patent No.: US 10,589,776 B2
(45) Date of Patent: Mar. 17, 2020

(54) USE OF A STEPPED SHRINK-FIT RING TO ASSEMBLE A STEERING ASSIST MOTOR IN A STEERING CASE

(71) Applicant: JTEKT EUROPE, Irigny (FR)

(72) Inventors: Patrice Brochot, Oullins (FR); Julien Stephanus, Lyons (FR)

(73) Assignee: JTEKT EUROPE, Irigny (FR)

( * ) Notice: Subject to any disclaimer, the term of this patent is extended or adjusted under 35 U.S.C. 154(b) by 110 days.

(21) Appl. No.: 15/563,298

(22) PCT Filed: Apr. 6, 2016

(86) PCT No.: PCT/FR2016/050785
§ 371 (c)(1),
(2) Date: Sep. 29, 2017

(87) PCT Pub. No.: WO2016/162633
PCT Pub. Date: Oct. 13, 2016

(65) Prior Publication Data
US 2018/0072342 A1 Mar. 15, 2018

(30) Foreign Application Priority Data

Apr. 8, 2015 (FR) .................................... 15 53012

(51) Int. Cl.
*F16D 1/08* (2006.01)
*B62D 5/04* (2006.01)
(Continued)

(52) U.S. Cl.
CPC ............ *B62D 5/0403* (2013.01); *B23P 11/00* (2013.01); *F16D 1/0829* (2013.01);
(Continued)

(58) Field of Classification Search
CPC ........ B62D 5/0403; B23P 11/00; B23P 11/02; F16D 1/0829; F16D 1/0835; H02K 5/04;
(Continued)

(56) References Cited

U.S. PATENT DOCUMENTS 7,128,183 B2 * 10/2006 Saruwatari ........... B62D 5/0421
180/444
8,985,265 B2 * 3/2015 Hagiwara ............ B62D 5/0406
180/443

(Continued)

FOREIGN PATENT DOCUMENTS

DE 102007003456 A1 8/2008
DE 102009027872 A1 1/2011
(Continued)

OTHER PUBLICATIONS

Aug. 29, 2016 International Search Report issued in International Patent Application No. PCT/FR2016/050785.

*Primary Examiner* — Joseph M Rocca
*Assistant Examiner* — Marlon A Arce
(74) *Attorney, Agent, or Firm* — Oliff PLC

(57) ABSTRACT

An assembly method in which an assembly ring is force-fitted between a first part and a second part such as to create: a tightening contact between the first part and the inner face of the ring, by means of plastic deformation of the ring, said tightening contact occupying a first interference zone; and a tightening contact between the second part and the outer face of the ring, said tightening contact occupying a second interference zone. The assembly ring comprises a first ring segment (T1) and a second ring segment (T2) which are stepped axially in relation to one another and which have different radial dimensions from one another, such as to confine the first interference zone to the first ring segment (T1) and the second interference zone to the second ring segment (T2), in order to prevent the first interference zone and the second interference zone from overlapping axially.

15 Claims, 2 Drawing Sheets

(51) Int. Cl.
*B23P 11/00* (2006.01)
*H02K 5/04* (2006.01)

(52) U.S. Cl.
CPC ............ *F16D 1/0835* (2013.01); *H02K 5/04* (2013.01); *F16C 2326/24* (2013.01); *H02K 2213/03* (2013.01)

(58) Field of Classification Search
CPC ............ H02K 2213/03; F16C 2326/24; Y10T 29/49934
See application file for complete search history.

(56) References Cited

U.S. PATENT DOCUMENTS

| | | | |
|---|---|---|---|
| 9,715,984 B2* | 7/2017 | Guo | ....................... H01H 50/02 |
| 2012/0175976 A1 | 7/2012 | Kessler et al. | |
| 2013/0302152 A1 | 11/2013 | Choji et al. | |
| 2014/0202415 A1* | 7/2014 | Wang | ................... F02N 11/087 |
| | | | 123/179.25 |

FOREIGN PATENT DOCUMENTS

| | | |
|---|---|---|
| DE | 102010003354 A1 | 9/2011 |
| EP | 0569269 A1 | 11/1993 |
| EP | 1863149 A2 | 12/2007 |
| EP | 2135796 A2 | 12/2009 |

* cited by examiner

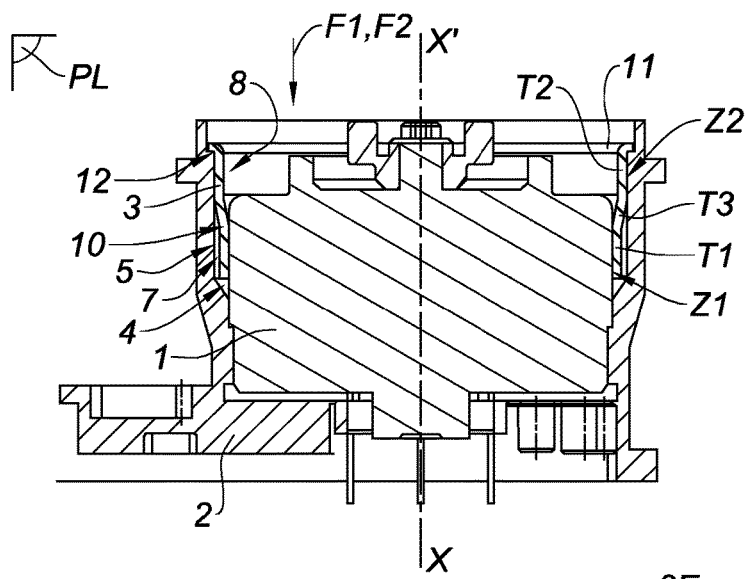
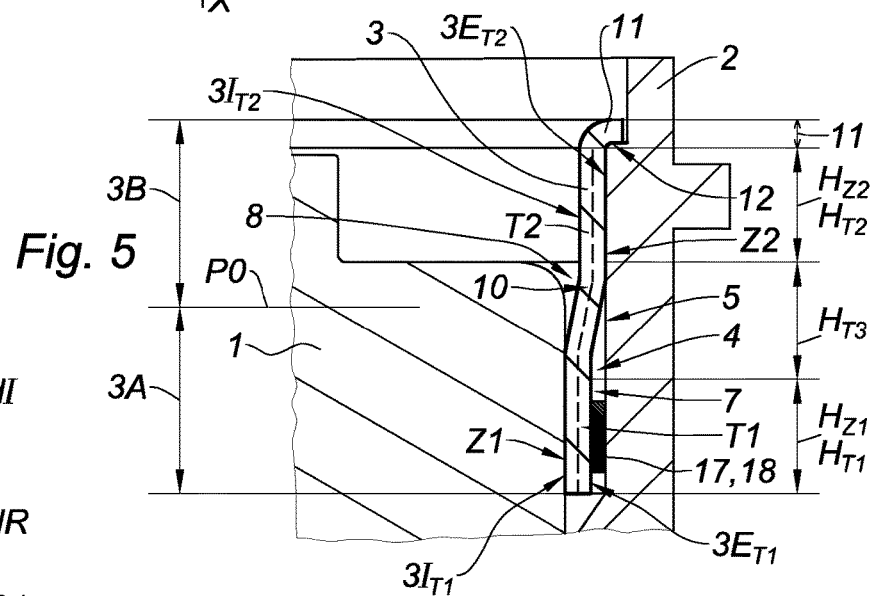
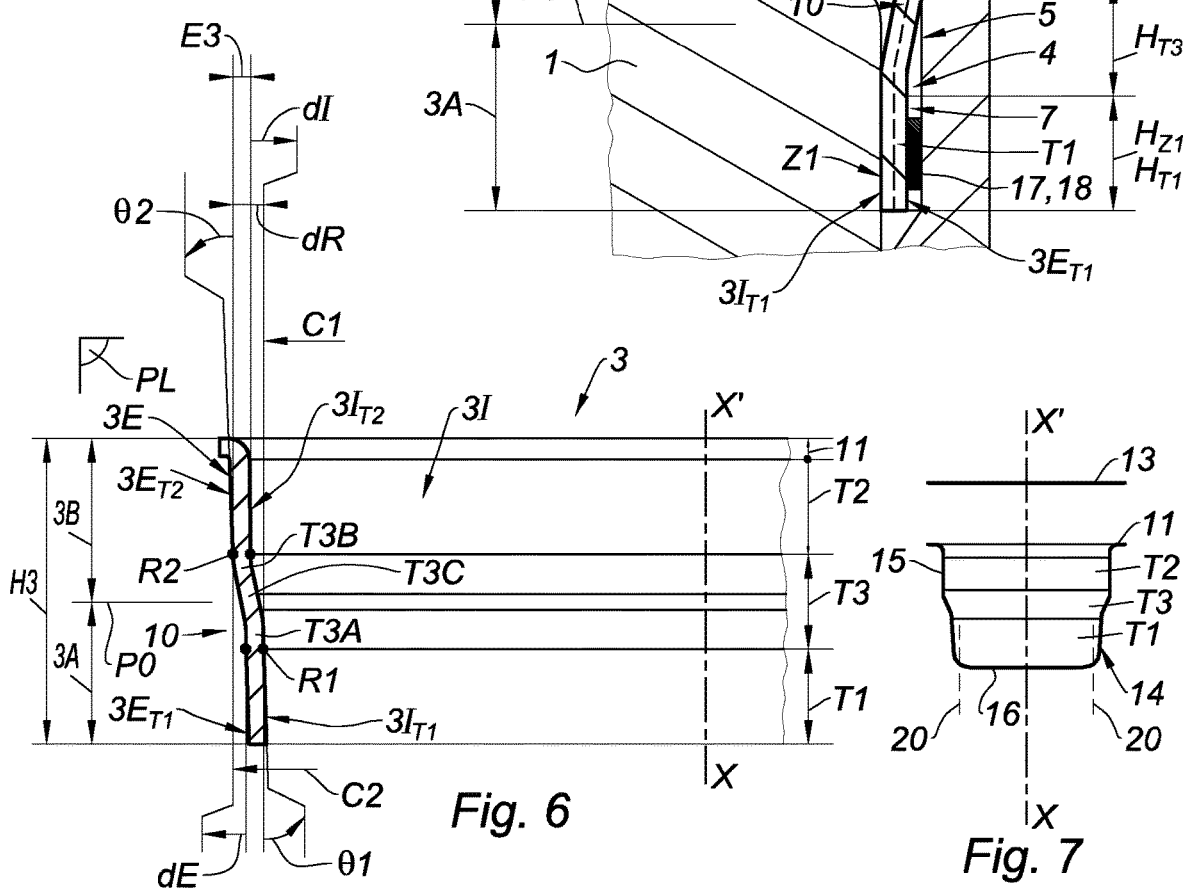
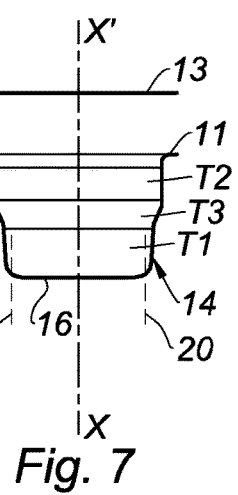

USE OF A STEPPED SHRINK-FIT RING TO ASSEMBLE A STEERING ASSIST MOTOR IN A STEERING CASE

The present invention concerns the assembly methods, of the shrink-fit type, which use both plastic and elastic forced deformation of a part against another part to create a tight assembly.

The present invention relates more particularly to an assembly method that can be used in the automotive field, and more specifically in the manufacture of power steering devices.

As such, the invention concerns more specifically the assembly of a steering assist motor in a steering case.

Within a power steering device, it is necessary to fasten the assist motor, generally an electric motor, in a steering case which is generally made of a light alloy, of the aluminum alloy or magnesium alloy type.

Usually, the assist motor has, in turn, a steel outer envelope of generally cylindrical shape. Said outer envelope may be formed, for example, by a steel casing added onto the stator of the motor or, more commonly, by a stacking of stator metal sheets, that is to say an assembly of discs made of fine-thickness steel which are stacked coaxially on one another along the direction of the axis of rotation of the motor shaft, so as to form a laminated stator.

Yet, the assembly operation of the assist motor on the steering case must overcome two major difficulties.

The first difficulty is that the manufacturing dimensional tolerances on the outer diameter of the envelope of the motor are relatively high, so that it is difficult, if not impossible, to obtain an adjustment, and therefore a perfectly predictable and reproducible clamping stress from one assembly to the other.

The second difficulty is that the material constituting the envelope of the motor, typically a steel, and the material constituting the steering case, typically an aluminum alloy, have very different coefficients of thermal expansion. Yet, the steering device is likely to be exposed to operating temperatures which vary within a relatively wide range, typically from −40° C. to +120° C., such that the assembly is subjected to phenomena of differential expansion which can induce, as appropriate, either a release of the clamping, likely to weaken the assembly or, on the contrary, an increase in inner stresses, likely to cause damage or even rupture of the parts, for example by cracking.

In view of these difficulties, different assembly solutions have been considered.

A first known solution consists in hot shrink-fitting the motor (the envelope of the motor) directly into the aluminum alloy case. The dimensional variations induced by heating, and more particularly the expansion of the case, during assembly, when the motor is introduced into said case, allow indeed to compensate the dimensional deviations related to the manufacturing tolerances, and thus to ensure in fine, after cooling, the effective clamping of one part on the other.

However, the assembly obtained accordingly by hot shrink-fit tends to generate high residual stresses in the case.

Therefore, in order to avoid a rupture under stress of the case, it is necessary to pair the motors with the cases, and/or to use a specific aluminum alloy which has a particularly high mechanical rupture strength.

This first assembly solution is therefore particularly expensive and sometimes tedious to implement.

A second known solution consists in interposing, between the motor and the case, during a press-mounting operation, a ring called «tolerance ring», which is in the form of a split annulus whose surface draws a succession of corrugated shapes.

Thanks to the radial elasticity that said corrugated shapes impart to the tolerance ring, said ring is pinched in radial compression between the motor and the case, so as to compensate the clearance between the motor and the case and to ensure, by friction, a link between these two parts.

If this second solution is more economical than the first one, it is however not free from disadvantages.

Thus, a first disadvantage of this second solution is that the tolerance rings, and more particularly the amplitude of their corrugated shapes, must be dimensioned so as to create a significant interference of the ring with the motor and with the case, and so that the assembly can remain solid, without releasing, over the operating temperature range already mentioned above.

Due to this strong interference, the corrugated shapes can in particular cause, during the forcible insertion of the motor and of the ring into the case, an abrasion of the case, and thus generate metal chips which create a risk of short-circuit at the motor or its electronic control.

Further, the high pressures exerted locally by the corrugated shapes on the case can cause locally a plastic deformation or even a cracking of said case.

Then, another disadvantage of the use of tolerance rings is due to the fact that the structure of the tolerance rings is complex and subject to dimensional variations from one ring to another, so that it is difficult to carry out a metrological control of the rings and, and a fortiori, to guarantee the reproducibility and the homogeneity of the assemblies, which can constitute a discomfort in mass production.

The objects assigned to the invention therefore aim to overcome the aforementioned disadvantages and to propose a new assembly method to forcibly assemble parts to one another by clamping, said method having to allow to obtain a homogeneous and effective clamping, ensuring a solid but nevertheless not too restrictive fastening for the parts, said method being, moreover, simple, rapid and inexpensive to implement.

The objects assigned to the invention are achieved by means of an assembly method allowing fastening a first part to a second part, during which:
  there is interposed between the first part and the second part a cylindrical assembly ring with a central axis (XX'), which has a radially inner face and a radially outer face,
  there is forcibly engaged the radially inner face of the assembly ring on the first part so as to create between the first part and the ring a clamping contact called «first clamping contact», which secures the first part and the ring, said first clamping contact occupying a total contact surface called «first interference area», on the radially inner surface of the ring,
  and there is forcibly engaged the radially outer face of the assembly ring on the second part so as to create between the second part and the ring a clamping contact called «second clamping contact», which secures the second part and the ring, said second clamping contact occupying a total contact surface called «second interference area», on the radially outer surface of the ring, said method being characterized in that there is used an assembly ring which includes a first cylindrical ring segment and a second cylindrical ring segment which are axially stepped relative to one another, along the central axis (XX'), and which have dimensions different from each other, in a section normal to the central axis (XX'), so as to confine the first interference area in the first ring segment and, respectively, the second interference area in the second ring segment, so that the first interference area and the second interference area do not axially overlap with each other.

Advantageously, thanks to a suitable arrangement of the assembly ring relative to the first and second parts to be assembled, the method in accordance with the invention allows to dissociate the functional areas of the assembly ring from each other, that is to say the first and second interference areas at which the ring comes into contact with, and interacts by radial compression with, the first part and the second part respectively.

To this end, the invention provides for creating within the ring, on the one hand, a first ring segment which is intended to receive the first part and which is arranged to accommodate (and contain entirely) the first interference area and, on the other hand, a second ring segment which is intended to receive the second part and which is arranged to accommodate (and contain entirely) the second interference area, said second ring segment being spatially distinct and distant from the first ring segment.

Advantageously, the spatial separation of the two ring segments is both axial and radial.

The axial separation is obtained by axially stepping, without axial overlap, the first ring segment and the second ring segment in such a way that the axial extent (or «axial height») of the first cylindrical ring segment, that is to say the axial abscissa range covered by the first segment, is different from the axial extent of the second cylindrical ring segment, that is to say the axial abscissa range covered by said second segment.

The radial separation is obtained by configuring the first segment in such a way that it presents, on at least one portion of its axial height (and preferably on the majority or the totality of its axial height), in a section perpendicular to the central axis (XX'), outer and/or inner radial limits, which differ from the corresponding, respectively outer and/or inner, radial limits of the second segment, and more particularly preferably so that the first segment has radial limits which are radially closer to the central axis (XX') than those of the second segment, so that the first segment is, radially, strictly tightened on the axis relative to the second segment.

Concretely, the spatial separation of the ring segments, and therefore the interference areas, allows to dedicate separately a first ring segment, and therefore a first interference area, specifically to the fastening by clamping (and where appropriate by shrink-fit) of the first part, and a second ring segment, and therefore a second interference area, specifically to the fastening by clamping (and where appropriate by shrink-fit) of the second part.

This distribution of the clamping areas advantageously allows the assembly ring in accordance with the invention to manage the clamping in an individual and different manner in each segment to which a (single) part is assigned, and therefore to individually manage the clamping for each part to be assembled, while ensuring generally the assembly unit.

concretely, the spatial distribution of the ring segments allows the first segment to present mechanical properties and a behavior which are relatively independent of the properties and the behavior of the second segment, and vice versa, which allows the ring to adapt specifically to dimensional tolerances, to the effects of thermal expansion, and to the states of stresses which are specific to each junction with one of the parts.

Thus, for example, it is possible to consider the assembly of a first part formed by a steel envelope motor, having a relatively small thermal expansion coefficient, but a wide dimensional manufacturing dispersion (tolerance interval) on a second part formed by a machined aluminum alloy case, having a coefficient of thermal expansion which is considerably higher than the steel envelope of the motor, but a small dimensional manufacturing dispersion (the machining guaranteeing a restricted tolerance interval).

Then, it is possible to use an assembly ring made of steel, whose large capacity to be deformed before rupture will allow the first segment to adapt very largely the magnitude of its initial deformation and therefore to accommodate the dimension (diameter) of the envelope of the motor whatever the value taken by this dimension in the wide predictable tolerance range. However, once clamped on the envelope of the motor, the first ring segment will have a thermal expansion behavior close to, or even identical to, that of the envelope of the motor, so that variations in operating temperature will affect little or even not affect at all the clamping of the motor within the first segment.

Conversely, the initial deformation of the second segment to accommodate the case, precisely machined, will be substantially identical from one assembly to the other, and will allow the second segment to retain some «reserve» of deformation, that it can exploit to accommodate, this time, the thermal expansions of said case, which are more significant than those of said second segment.

Moreover, when the assembly ring in accordance with the invention is mounted by clamping, or even by shrink-fit, on the first part respectively on the second part, said ring, and more particularly the concerned ring segment, will plasticize, that is to say will be plastically deformed permanently (irreversibly) in order to accommodate the dimensions of each part, as soon as the stresses exerted to forcibly insert the ring against the part will exceed the elastic limit of said ring.

It is therefore the assembly ring which will serve as a martyr, and which will endure the essential if not all the plastic deformations imposed by the mounting.

In this way, the assembly stresses subjected to the parts (here the envelope of the assist motor, and especially the steering case) will not exceed a predetermined threshold which corresponds substantially to the respective elastic limit of each of said parts, thus avoiding the deterioration of said parts.

The invention will therefore considerably reduce the risk of cracking and bursting of the parts, in particular of the second part, both at the time of assembly and later, during operation.

The service life of the assembly will be greatly improved.

Furthermore, it should be noted that, once reaching a degree of permanent plastic deformation of the ring which is sufficient to accommodate the dimensions of the part, it is the elastic tension of the ring, due to the reversible elastic deformation of said ring (elastic deformation which varies in particular over the changes of temperature and the stresses exerted by the part against the ring), which will ensure the maintaining, by friction, of the linking (of the clamping) with the concerned part.

Finally, the invention advantageously allows to use, in order to carry out the fastening of the first part on the second part, an assembly ring which has a particularly simple shape, in particular an axisymmetric shape, which is easy and inexpensive not only to manufacture but also to control, since it can be defined using simple metrological parameters (such as, typically, the characteristic diameters of the segments and the radial thickness of the body of the ring).

Other objects, characteristics and advantages of the invention will appear in more detail upon reading the following description, as well as with the help of the appended drawings, given purely by way of non-restrictive illustration, among which:

FIG. 4 illustrates, according to a longitudinal sectional view, an example of assembly, according to the invention, of a motor in a case by means of a second variant of an assembly ring, provided with a collar.

FIG. 5 illustrates, according to an enlarged detail view, a portion of the assembly of FIG. 4.

FIG. 6 illustrates, according to a partial longitudinal sectional view, the collar assembly ring used in the assembly of FIGS. 4 and 5.

FIG. 7 illustrates, according to a schematic longitudinal sectional view, a method for manufacturing an assembly ring in accordance with the invention, by stamping and then punching.

Figure 1:
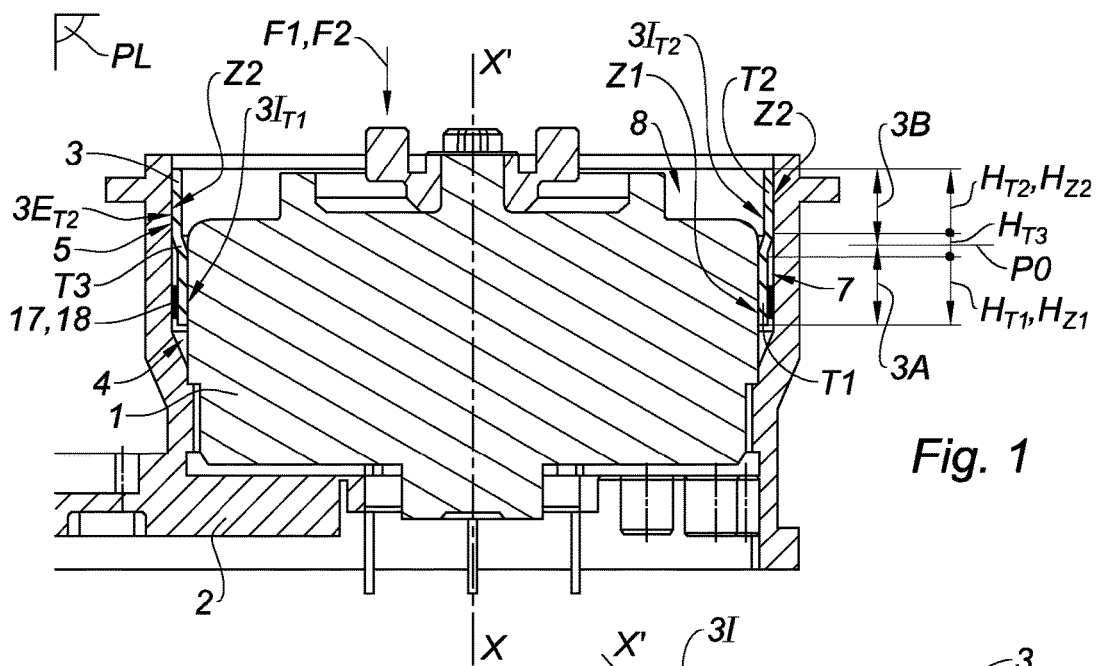
FIG. 1 illustrates, according to a longitudinal sectional view, an example of assembly according to the invention of a motor in a case by means of a first variant of an assembly ring.

The present invention concerns an assembly method which allows fastening a first part 1 to a second part 2.

According to a preferred variant of application, the first part 1 will be formed by a motor, and more precisely by the envelope of said motor.

Said motor envelope will be preferably made of metal, for example of steel, and will have a substantially cylindrical shape, preferably a shape of a circular based-cylinder.

Preferably, the motor will be an electric motor, and more particularly an (electric) steering assist motor intended to equip a power steering device of a motor vehicle designed for the transport of goods and/or persons.

Preferably, the second part 2 will form a case, typically a steering case intended to be fastened to the frame of a vehicle.

Said steering case 2 may be made integrally, or on the contrary in several portions, for convenience of manufacture and assembly.

Said steering case 2 will be designed to receive, in addition to the assist motor 1, a steering mechanism.

Said steering mechanism will preferably comprise a drive pinion carried by a steering column and meshing with a rack, which rack is guided in translation in the steering case and which controls the maneuver of steering tie rods in order to change the orientation of the steered wheels of the vehicle.

For convenience of description and numbering, the first part 1 can be assimilated in the following to the envelope of the motor, and more simply to the motor, and the second part 2 can be assimilated to the case.

Preferably, the assembly obtained according to the method in accordance with the invention will be designed to withstand operating temperatures covering at least the range comprised between 0° C. and +100° C., preferably between −40° C. and +120° C., or even between −50° C. and +150° C. The selection and dimensioning of the constituent materials, in particular parts 1, 2 and of the assembly ring 3, will therefore be done accordingly.

During the assembly method, an assembly ring 3 (hereinafter «ring») is interposed between the first part 1 and the second part 2.

The method therefore comprises, previously, a step (a) of providing an assembly ring 3.

The assembly ring 3 is cylindrical, with a central axis (XX'), preferably rectilinear.

Said ring 3 has a radially inner face 3I, oriented radially towards the central axis (XX'), and a radially outer face 3E oriented radially opposite the central axis (XX') relative to the radially inner face 3I.

The material constituting the body of the ring 3 which lies between the radially inner surface 3I and the radially outer surface 3E forms therefore the side wall of the ring, which is wound around the central axis (XX').

Preferably, the thickness E3 of said side wall, that is to say the distance which separates radially the inner surface 3I from the outer surface 3E, is substantially constant over the entire axial extent of the ring 3, and over the entire angular sector covered (in yaw) by said ring about the central axis (XX').

For convenience of description, «axial» designates a direction or a dimension considered according to the direction of the central axis (XX'), or parallel to the latter.

The coordinates associated with the central axis (XX') and allowing to locate an axial position along said central axis (XX') will be referred as «abscissa».

Similarly, «radial» designates a direction or a dimension considered transversely to the central axis (XX'), according to a direction substantially perpendicular to said central axis (XX').

During the method in accordance with the invention, and more particularly during a step (b) of securing the assembly ring 3 with the first part 1, there is forcibly engaged the radially inner face 3I of the assembly ring 3 on the first part 1 (here against and around a radially outer face of the first part 1, that is to say a radially outer face of the envelope of the motor), so as to create between the first part 1 and the ring 3 a clamping contact called «first clamping contact», which secures the first part 1 and the ring 3, said first clamping contact occupying, on the radially inner surface 3I of the ring, a total contact surface called «first interference area», Z1, as seen in FIGS. 1, 4 and 5.

During the method in accordance with the invention, and more particularly during a step (c) of securing the assembly ring 3 with the second part 2, there is also forcibly engaged the radially outer face 3E of the assembly ring 3 on the second part 2 (here, against and inside a radially inner face of the second part 1, that is to say a radially inner face of the case) so as to create between the second part 2 and the ring 3 a clamping contact called «second clamping contact», which secures the second part 2 and the ring 3, said second clamping contact occupying a total contact surface called «second interference area», Z2, on the radially outer surface 3E of the ring, as seen in FIGS. 1, 4 and 5.

The forced engagement of the ring 3 on the first part 1, respectively on the second part 2, is obtained by press mounting, and/or by shrink-fit (with hot expansion and/or cold contraction of the concerned part 1, 2 or, where appropriate, the ring 3), with a force intensity sufficient to cause, at least locally, in addition to an elastic deformation, a permanent plastic deformation of the ring 3, in particular in the first and second interference areas Z1, Z2.

Thus, during the assembly according to the invention, the plastic (irreversible) deformation of the ring 3, and more particularly of the first segment T1, will be forced against the first part 1 so that the ring 3 plastically accommodates the dimensions of said first part 1, and the plastic (irreversible) deformation of the ring 3, and more particularly of the second segment T2, will also be forced against the second part 2, so that the ring 3 plastically accommodates the dimensions of said second part 2.

In other words, the contacts between the ring 3 and the parts 1, 2 will be created by plastic deformation of said ring 3 (while also remaining under the elastic limit $Rp_{0.2}$ of the parts 1, 2, that is to say without causing plastic deformation of said parts 1, 2, at least without causing plastic deformation of said parts 1, 2 greater than 0.2%).

The elastic tension linked to the residual elastic deformation of the ring 3 against the parts 1, 2 will ensure, in turn, the clamping of the first segment T1 against the first part 1 and respectively of the second segment T2 against the second part 2.

In practice, an assembly obtained by such a clamped adjustment, involving a plastic deformation of the ring 3 in addition to its elastic deformation, can therefore in principle not be dismantled without damaging the ring 3.

Advantageously, the clamping contact allows a fastening, here by constriction, which eliminates all the degrees of freedom between the assembly ring 3 and the concerned part 1, 2.

In particular, in the case of the assembly of a motor 1 on a case 2, the clamping contact, that is to say the induced friction between the ring 3 and the concerned part 1, 2 due to the tensioning of the ring 3 and to the compression of said part 1 (or conversely for the second part 2) will be sufficient so that the assembly can resist, without the part 1, 2 rotating in the ring 3, to a torsion torque, here oriented about the central axis (XX'), which will be at least equal to the maximum torque that can be delivered by the motor 1, or even at least equal to five times said maximum torque that can be delivered by the motor 1.

As an indication, in particular in the context of an application to the assembly of a power steering motor 1, the clamping (and therefore the adjustment degree chosen by the dimensioning of the ring 3 relative to the parts 1, 2, as well as the conformation and the extent of the contact surface offered by the ring 3 to each part 1, 2) can be determined so as to be able to resist a torsion torque at least equal to 5 N.m, or even at least equal to 25 N.m.

In a particularly preferred manner, the clamping will only take place mechanically, by deformation, mainly supported by the ring 3, without adding other blocking means, and in particular without adding glue, nor pressure screws, nor reinforcing wedges nor welds.

Preferably, as illustrated in FIGS. 1, 4 and 5, the second part 2 (case) comprises a housing 4 intended to receive at least partially, the first part 1 (motor).

Said housing 4 is preferably sufficiently large to accommodate, and therefore contain, the majority (that is to say more than half of the overall volume) of the first part, or even almost all (at least 90%, or even 100% of the volume) of said first part 1.

Likewise, the housing 4 is preferably arranged so as to be able to receive and therefore contain the majority of the ring 3 (that is to say the ring can be inserted over more than 50% of its overall axial height H3 in said housing 4), or even almost all of said ring 3 (that is to say the ring can be inserted over more than 90%, or even 100%, of its overall axial height H3 in said housing 4).

The assembly ring 3, as well as the first part 1 (motor), can thus be advantageously engaged and each mostly or even wholly contained inside the second part 2 (case), in this case inside the housing 4.

Such an arrangement by nesting of the second part 2, of the ring 3 and of the first part 1, here according to a concentric nesting converging radially towards the central axis (XX'), that is to say according to an nesting in which the second part 2, the ring 3 and the first part 1 are disposed radially one inside the other so as to move successively (in this order) closer to the central axis (XX'), will guarantee the compactness of the assembly, and will further offer good protection to the first part 1, to the ring 3, as well as to the interference areas Z1, Z2, vis-à-vis the environment of said assembly, since the second part 2 thus forms a protective barrier which, in the assembled configuration, wraps the ring 3 and the first part 1.

As such, it should be noted that it will be thus possible to avoid an anti-corrosion treatment of the steel envelope of the motor 2, since said envelope will be housed safely in the housing 4, sealed in a water and dust tight manner by the ring 3.

The housing 4 may in particular have a bore 5, centered on the central axis (XX'), and in which the ring 3 can be depressed (forcibly) in such a way that the radially outer surface 3E of the ring bears, under radial pressure, against the wall of said bore 5, as can be seen in FIGS. 1, 4 and 5.

The bore 5 is preferably machined and rectified according to a predefined relatively severe tolerance, typically less than or equal to 0.05 mm (to the diameter), in order to guarantee the reproducibility and low dispersion of the clamped adjustment.

As regards the order for fastening the parts, it is preferably possible to first add and fasten the ring 3 on the second part 2, here in the housing 4, and more particularly thread the ring 3 forcibly in the bore 5, by approaching the housing 4 according to a direction of penetration substantially parallel to the central axis (XX'), then, only afterwards, thread, in turn, the first part 1 (the motor) in the housing 4, through and against the ring 3 retained by the first part 1.

However, it would be perfectly possible, without departing from the scope of the invention, to consider a reverse order, consisting first in adding and fastening the ring 3 on (and more particularly around) the first part 1 (here the motor) before transferring to the second part 2, and more particularly inserting in the housing 4, the sub-assembly ring 3/first part 1 previously constituted accordingly.

Whatever the considered assembly order, it will be noted that the use of an assembly ring 3, of the shrink-fit ring type, to assemble the parts 1 and 2 provides a particularly stable fastening, with a good seat, due in particular to the great extent of the contact surfaces between the ring 3 and each of the parts 1, 2 (in terms of diameter, and therefore of perimeter, as well as of axial height).

According to the invention, there is used an assembly ring 3 which includes a first cylindrical ring segment T1 (hereinafter «first segment») and a second cylindrical ring segment T2 (hereinafter «second segment») which are axially stepped relative to each other, along the central axis (XX'), and which have (radial) dimensions different from each other, in a section normal to the central axis (XX'), so as to confine the first interference area Z1 in the first ring segment T1 and, respectively, the second interference area Z2 in the second ring segment T2, so that the first interference area Z1 and the second interference area Z2 do not axially overlap with each other.

Preferably, the segments T1, T2 of the ring 3 are configured with respect to the parts to be assembled 1, 2 in such a way that, on the one hand, all the phenomena of interference (clamping) which occur between the ring 3 and the first part 1 are circumscribed axially, that is to say more particularly in such a way that the extent of the first interference area Z1 is circumscribed in a first range of abscissa (or «axial height») $H_{Z1}$ which is contained or even coincides (as illustrated in FIGS. 1 and 5) with the abscissa range $H_{T1}$ occupied by the first segment T1, and in such a way that, on the other hand, all the total interference (clamping) phenomena which occur between the ring 3 and the second part 2 are axially circumscribed in a similar manner, that is to say more particularly in such a way that the extent of the second interference area Z2 is circumscribed in a second abscissa range $H_{Z2}$, which is contained or even coincides (as illustrated in FIGS. 1 and 5) with the abscissa range $H_{T2}$ occupied by the second segment T2 and, especially, which has no axial overlap with the first abscissa range $H_{Z1}$, no inclusion in the first abscissa range $H_{Z1}$, nor any (axial) range common with said first abscissa range $H_{Z1}$ (and vice versa).

It should be noted here that ring «segment» T1, T2, in the usual meaning of this term, designates a «slice» of the cylinder constituting said ring 3, which slice is comprised between two fictitious base planes normal to the central axis (XX') and axially spaced apart from one another.

Advantageously, the axial (by their stepping along the axis) as well as the radial (by their difference in a section normal to the axis) distribution of the first and second ring segments T1, T2 allows to separate, both axially and radially, the two interference areas Z1, Z2, by making each of said interference areas Z1, respectively Z2, contained in (limited to) a segment T1, respectively T2, which is specific thereto.

More particularly, it will be thus possible to define (that is to say there will exist) along the central axis (XX') at least one fictitious gauge plane P0, perpendicular to said central axis (XX'), which axially subdivides the ring 3 into a downstream portion 3A located on one side of said gauge plane P0, here the lower portion in FIGS. 1, 3, 4, 6, and an upstream portion 3B, located on the other side of said gauge plane P0, so that the first interference area Z1 (and, structurally, the first segment T1) is contained in, and limited to, the downstream portion 3A of the ring 3, while the second interference area Z2 (and, structurally, the second segment T2) is contained in, and limited to, the upstream portion 3B, without crossing axially the boundary formed by the gauge plane P0.

In other words, according to the invention, it is preferable to define, within the assembly ring 3, (at least) a gauge plane P0 normal to the central axis (XX') of said ring 3, which is such that a first interference area Z1, which corresponds to, and covers, the totality of the clamping interference phenomena (by radial constriction) which occur between the ring 3 and the first part 1 (motor), is contained in, and limited to, one side of the gauge plane P0 corresponding to the downstream portion 3A of the ring, while a second interference area Z2, which corresponds to, and covers, the totality of the clamping interference phenomena (by radial constriction) which occur between the ring 3 and the second part 2 (case), is contained in, and limited to, the other side of said gauge plane P0 corresponding to the upstream portion 3B of the ring.

Preferably, the median plane which intersects the ring 3 at half its total axial height H3 and perpendicularly to the central axis (XX') may be considered as a gauge plane P0, so that the first interference area Z1 will be axially confined in a downstream portion 3A forming a first half of the ring 3, that is to say here, in FIGS. 1 to 6, in the lower half of the ring 3 while the second interference area Z2 will be confined in an upstream portion 3B forming the other half of the ring 3, located on the other side of the median plane P0, here the upper half of said ring.

Similarly, it is possible to define at least one cylindrical gauge envelope C1, C2, centered on the central axis (XX') and parallel to said central axis (XX'), said cylindrical gauge envelope C1, C2 marking a radial boundary which delimits, on the one hand, an inner cylindrical (radially closed) space, containing the central axis (XX'), and within which one of the interference areas, preferably the first interference area Z1, is confined radially and, on the other hand, an outer cylindrical space (radially open on the outside) located radially beyond said gauge surface C1, C2, and in which the other interference area, here the second interference area Z2, is confined.

Thus, it will be possible to radially confine the first interference area Z1 in a first crown, located at a first radial distance (distance range) from the central axis (XX'), and radially confine the second interference area Z2 in a second crown located at a second radial distance from the central axis (XX'), distinct from the first radial distance, and preferably farther from the central axis (XX') than the first crown in the case of the variants illustrated in FIGS. 1 and 4 and 5.

Figure 3:
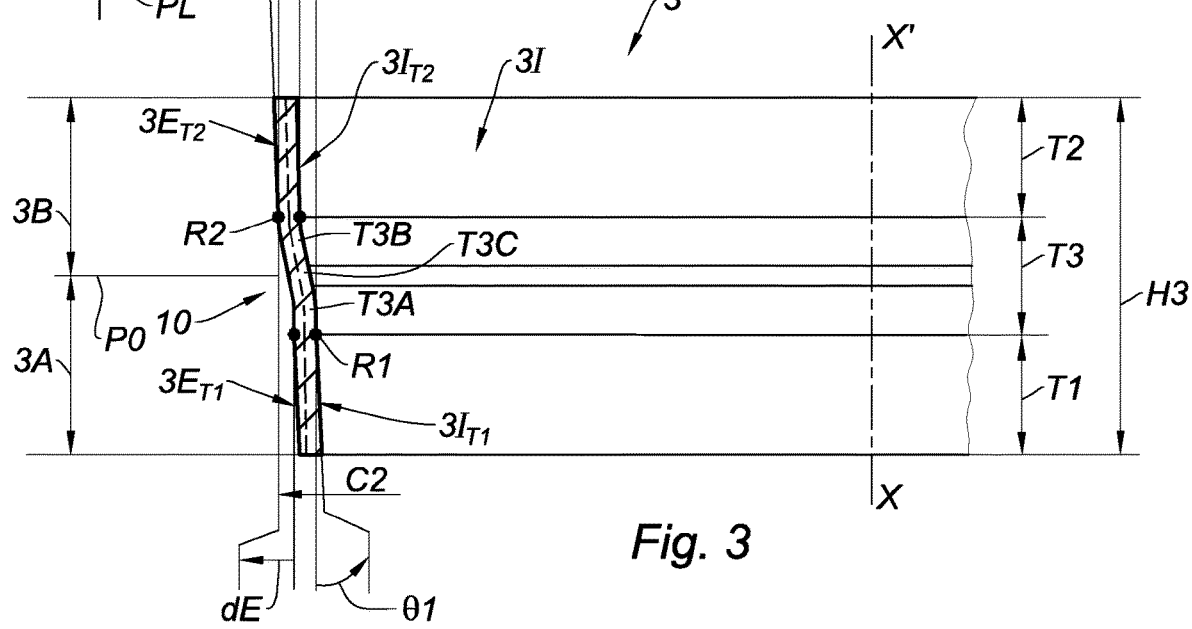
FIG. 3 illustrates, according to a partial longitudinal sectional view, the assembly ring of FIGS. 1 and 2.

According to a particularly preferred variant, it will be thus possible to define, as seen in FIGS. 3 and 6, at least one first cylindrical gauge envelope C1 such that all the inner face 3I of the downstream portion 3A of the ring 3 (here below the gauge plane P0), and in particular the inner face $3I_{T1}$ of the first segment T1, is entirely contained radially inside said first gauge envelope C1, while the entire inner face 3I of the upstream portion 3B of the ring 3, and in particular the inner face $3I_{T2}$ of the second segment T2, is entirely located radially beyond said first gauge envelope C1, that is to say is farther from the central axis (XX') than the inner face of the downstream portion 3A of the ring.

Similarly, alternatively, or preferably cumulatively, it is preferable to define, as seen in FIGS. 3 and 6, a second cylindrical gauge envelope C2 such that the entire outer face 3E of the upstream portion 3B of the ring 3 (here above the gauge plane P0), and, in particular the outer face $3E_{T2}$ of the second segment T2, is entirely located radially beyond said second gauge envelope C2, while the entire outer face 3E of the downstream portion 3A of the ring 3, and in particular the outer face $3E_{T1}$ of the first segment T1 is entirely contained radially inside said second gauge envelope C2, that is to say is closer to the central axis (XX') than the outer face of the upstream portion 3B.

Advantageously, the controlled spatial separation of the interference areas Z1, Z2 allows to ensure that, whatever the abscissa considered along the axis (XX'), in the overall axial height H3 covered by the ring 3, and whatever, at said considered abscissa, the azimuthal direction which is considered (in yaw) about the axis (XX'), in the majority and preferably in the totality of the angular sector covered by the ring about said central axis (XX'), there is no place in which the ring 3 would be blocked simultaneously on its two inner 3I and outer 3E faces, at the same abscissa, that is to say in which the ring 3 would be pinched according to a strictly radial direction at the same abscissa between the first part 1 and the second part 2.

In other words, the separation of the interference areas Z1, Z2 advantageously allows interposing radially the ring 3 between the first part 1 and the second part 2, according to a configuration which is therefore particularly robust and stable, but without completely sandwiching the ring 3.

Thus, the invention allows to maintain exposed the radially outer face of the ring $3E_{T1}$ which is located in the first segment T1, on the face (radially) opposite to the first interference area Z1 (that is to say on the «back» of said first interference area Z1) and therefore opposite to the inner face $3I_{T1}$ of said first segment T1 against which the first part 1 bears, as illustrated in particular in FIG. 5.

Thus, there is released a first clearance space 7 (here the interstice comprised between the outer face $3E_{T1}$ of the first segment T1 and the bore 5) which, left vacant, preserves some radial displacement margin for the first segment T1, which thus preserves a capacity to be deformed radially, and more particularly to be expanded radially, here by moving away from the central axis (XX'), outwardly, in a relatively free manner, without being hindered by the second part 2 (in this case without abutting against the bore 5).

Similarly, the invention allows to maintain exposed the radially inner face of the ring $3I_{T2}$ which is located in the second segment T2, on the face (radially) opposite to the second interference area Z2 (that is to say on the «back» of said second interference area Z2) and therefore opposite to the outer face $3E_{T2}$ of said first segment T1, as illustrated in particular in FIG. 4.

Here again, it is possible to release a second clearance space 8 which allows the second segment T2 to preserve a radial deformation capacity, and in particular an expansion, here by moving closer to the central axis (XX'), inwardly, without being hindered by the first part 1.

Advantageously, these clearance spaces 7 and 8 avoid the undesirable obstacles which could oppose the useful axial displacements of the first and second parts 1, 2, in particular during the assembly operations and then when the constituted assembly is subjected, in operation, to temperature variations.

Thus, the first clearance space 7 allows to easily introduce the ring 3 into the housing 4 of the second part, by first penetrating the first segment T1 of the ring 3 into the bore 5 and then the second segment T2, without the first segment T1 interfering with the bore 5.

In operation, the first clearance space 7 allows the assembly to accommodate the axial components of the differential expansions between the ring 3 and the second part 2 (case), the wall of the bore 5 preserving a possibility of «sliding» axially under the stress relative to the radially outer face 3E of the ring 3 and more particularly relative to the radially outer face of the second portion $3E_{T2}$.

Similarly, the second clearance space 8 facilitates the introduction of the first part 1 (motor) inside the ring 3, where appropriate, while said ring 3 is already fastened in the housing 4, in particular by authorizing the first part 1 to pass through (axially, here according to a downward movement) the second segment T2 without interference with said second segment T2, so that the first part 1 can reach safely the first segment T1 where it is fastened.

It should also be noted that the «cylindrical» shape of the assembly ring 3 can be understood in the broad sense, the cylinder being for example able to be generated by generator lines which are not strictly parallel to the central axis (XX'), and/or which describe a base (normal to the central axis) which is not circular but for example oval or polygonal.

In any event, the first segment T1, and more particularly the inner face $3I_{T1}$ of said first segment, will have a shape and dimensions substantially mating those of the first part 1 on which said first segment should be engaged.

It will be the same for the second segment T2, and more particularly for the outer face $3E_{T2}$ of said second segment, which will have a shape and dimensions substantially mating those of the second part 2 on which said second segment should be engaged.

Of course, said dimensions of the first segment T1, respectively of the second segment T2, and more particularly of the «functional» faces of said segments T1, T2 on which the parts 1, 2 bear (that is to say exert a radial pressure), will be adapted in order to produce the desired clamped adjustment, and more particularly in order to cause the plastic deformation, at least locally, of the first segment T1 and of the second segment T2 during the forcible mounting on their respective part 1, 2.

In this case, the (nominal, at rest, before assembly) dimensions of the first segment T1 will therefore be tightened relative to the nominal dimensions of the first part 1, while the nominal dimensions of the second segment T2 will be enlarged relative to the nominal dimensions of the second part 2.

Figure 2:
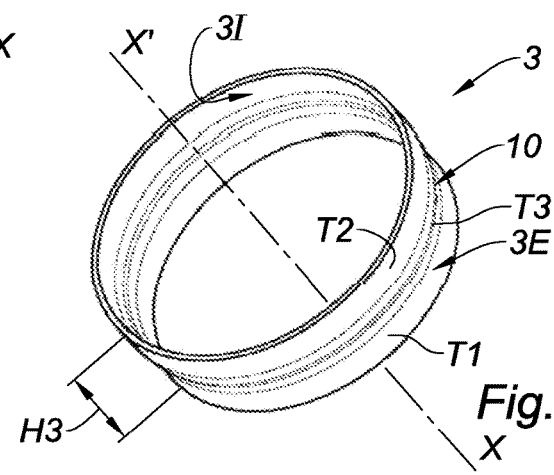
FIG. 2 illustrates, according to an overall perspective view, the assembly ring implemented within the assembly of FIG. 1.

According to a particularly preferred variant, and as in particular illustrated in FIGS. 2, 3 and 6, the assembly ring 3 has an axisymmetric shape about the central axis (XX').

Said axisymmetric shape will be generated by scanning, about the central axis (XX'), a section called «profile section», considered in a longitudinal section plane PL containing said central axis (XX'), as shown in particular in FIGS. 3 and 6.

Advantageously, the implementation of a revolution ring 3 allows to obtain radially inner 3I and radially outer 3E surfaces, in particular at the first and second segments T1, T2, which are in the form of smooth annular strips of constant radius (at a/each considered abscissa), without corrugations, which provides contact with the parts 1, 2, and therefore a clamping of said parts 1, 2, particularly homogeneous, stable and well distributed about the central axis (XX'), on (all) the perimeter of the ring 3.

An axisymmetric shape also allows a rapid, economical and precise manufacture of the ring 3, in particular by stamping a blank, by plastic deformation of a tube, for example by hydroforming, or by turning, and simplifies the definition of metrological controls.

According to a possible implementation, the ring 3 could be possibly split over its entire axial height H3, so as to be in the form of an open ribbon bent over on itself.

However, according to a particularly preferred variant, the assembly ring 3 forms, as particularly shown in FIG. 2, a closed annulus having a continuity of material all about the central axis (XX').

In other words, said ring 3 is preferably devoid of a slot which would cut it axially over its entire axial height.

Such a non split arrangement is indeed much more stable dimensionally.

It therefore allows to better center the first part 1 (motor), with increased accuracy and reproducibility.

Such a non split arrangement further provides a more accurate clamping with a better controlled and more homogeneous clamped adjustment, equally distributed all the way around the ring 3, by 360 degrees about the central axis (XX').

The clamping obtained thereby by a continuous ring is also more robust than a clamping obtained by a split ring, a clamping by a split ring being indeed more exposed to inopportune releases and therefore to a risk of sliding (in particular in torsion) of the first part 1 relative to the ring 3 and/or relative to the second part 2.

Generally, the side wall of the ring 3 will be preferably solid, not perforated.

In particular, the first segment T1 and the second segment T2 may be preferably devoid of any slot, through hole or cut, in particular of any axial slot which would open at one axial end of the ring and would be likely to weaken the clamping.

Preferably, as clearly shown in FIGS. 1, 3, 4, 5 and 6, the first ring segment T1 is, particularly at rest, before the ring 3 is forcibly engaged on the parts 1, 2, more tightened on the central axis (XX') than the second ring segment T2, so that the radially inner face $3I_{T1}$ of said first ring segment T1 is radially closer to the central axis (XX') than the radially inner face $3I_{T2}$ of the second ring segment T2 and, respectively, the radially outer face $3E_{T1}$ of the first ring segment T1 is radially closer to the central axis (XX') than the radially outer face $3E_{T2}$ of the second ring segment T2.

Such a disposition allows in particular to offset (radially) the interference areas Z1, Z2 relative to each other while creating (radially) clearance spaces 7, 8 which facilitate the insertion and the successive nesting of the ring in the housing 4 of the second part 2 (case) and then of the first part 1 (motor) in the ring 3, or vice versa.

The tightening of the first segment T1 relative to the second segment T2 is further preferably over the majority, and preferably the totality of the circumference of the ring 3 about the central axis (XX'), that is to say in all the azimuths comprised in an angular sector (in yaw) greater than 180 degrees, by 270 degrees, or even preferably equal to 360 degrees about said central axis (XX').

In other words, the inner face $3I_{T1}$ of the first segment T1 (which comes into contact with the first part 1) is preferably entirely situated set back from the inner face $3I_{T2}$ of the second segment, that is to say strictly closer to the central axis (XX') than said inner face $3I_{T2}$, while the outer face $3E_{T2}$ of the second segment T2 (which comes into contact with the second part 2) is preferably entirely situated in an outer radial offset from the outer face $3E_{T1}$ of the first segment T1.

The first segment T1 will thus form a «narrow» segment, more tightened on the central axis (XX') than the second segment T2 which forms a (slightly) «wider» segment.

By way of example, in particular in the context of the application of the method to the fastening of a steering assist motor 1 in a case 2, the inner diameter (in particular the minimum diameter) of the ring 3, and more particularly the diameter of the first cylindrical gauge surface C1, and even more particularly the diameter of the radially inner face of the first segment $3I_{T1}$, may be substantially comprised between 70 mm and 100 mm, or even between 80 mm and 90 mm, and for example substantially equal to 82 mm.

Similarly, the outer diameter of the ring 3, and more particularly the diameter of the second gauge surface C2, and even more particularly the diameter of the radially outer face of the second segment $3E_{T2}$, which here will be strictly greater than the diameter of the radially inner face of the first segment $3I_{T1}$, but also, in this case, strictly greater than the diameter of the radially outer face $3E_{T1}$ of this same first segment T1, will also be preferably comprised between 70 mm and 100 mm, or even between 80 mm and 90 mm, for example substantially equal to 84.5 mm.

As indicated in FIGS. 3 and 6, dE designates the outer (centrifugal) radial offset corresponding to the outer (minimal) radial clearance measured between the radially outer face of the first segment $3E_{T1}$ and the radially outer face of the second segment $3E_{T2}$.

Similarly, dI designates the inner (centripetal) radial offset corresponding to the inner (minimum) radial clearance measured between the radially inner face of the second segment $3I_{T2}$ and the radially inner face of the first segment $3I_{T1}$.

The value of the outer radial offset dE, respectively, the value of the inner radial offset dI will be chosen sufficiently high to create the functional clearances intended to avoid undesired contacts between the parts 1, 2 and the ring 3, and in particular to create (radially) the clearance spaces 7, 8 described above.

Said outer radial offset value dE, respectively, said value of the inner radial offset d1, however, must also be as low as possible, in order to reduce the stresses in the assembly.

The value of the outer radial offset dE, respectively the value of the inner radial offset dI, can thus be comprised between 0.5 mm and 2 mm, and preferably substantially equal to 1 mm.

These offset values dE, dI will preferably represent between 0.5% and 2.5%, and more particularly between 1% and 1.5% of the average diameter of the ring 3, and more particularly the diameter of the radially inner face of the first segment $3I_{T1}$, in particular if it is considered that said diameter is comprised between 80 mm and 85 mm, and for example equal to 82 mm as indicated above.

According to a possibility of arrangement, particularly well adapted to a ring 3 of constant thickness E3, the two radial, outer and inner offset values will be equal: dE=dI.

Moreover, the thickness E3 of the ring 3 will be of course chosen so that the ring is sufficiently thick to have good robustness, in order to be able to resist the assembly stresses and in particular the rupture by tearing, but nevertheless sufficiently fine to have a good deformation capacity (both plastic deformation and elastic deformation) guaranteeing the feasibility of the forcible mounting and the quality of the clamping.

As such, the (radial) thickness E3 of said ring 3 will be preferably greater than or equal to 0.5 mm, and preferably 1 mm, and less than or equal to 2.5 mm, or even 2 mm.

Preferably, said thickness E3 will be substantially equal to 1.5 mm.

Furthermore, in order to limit the stresses in the assembled parts 1, 2, it will be sought to limit and to minimize the total radial offset dR between the «functional» faces of the ring intended to receive respectively the first part 1 and the second part 2, that is to say in this case, as illustrated in FIGS. 3 and 6, to minimize the total radial offset dR between the radially outer face of the second segment $3E_{T2}$ and the radially inner face of the first segment $3I_{T1}$.

For this purpose, the ring 3 is preferably dimensioned such that the total radial offset dR remains less than or equal to 4 mm, preferably less than or equal to 3 mm, and for example substantially equal to 2.5 mm.

In the present case, said total offset being equal to dR=dE+E3=E3+dI, we will have, with regard to the preferred examples mentioned above, dR=1.5 mm$_{E3}$+1 mm$_{dE,di}$=2.5 mm.

Preferably, as illustrated in FIGS. 1 to 6, the first ring segment T1 forms a first axial end of the ring 3, in this case the lower end on said Figures, and/or the second ring segment T2 forms a second axial end of the ring 3, opposite the first axial end, here an upper end.

Advantageously, such a disposition of the segment(s) T1, T2 at the ends of the ring 3 allows to use a ring which preserves a good compactness, although it offers a significant axial offset of the interference areas Z1, Z2, allowing to separate said interference areas from one another.

Further, this end disposition of the segments(s) T1, T2 allows simple and immediate access of the parts 1 to their respective fastening segment T1, T2, which simplifies the assembly.

Preferably, as seen in FIGS. 1 to 7, the first ring segment T1 and the second ring segment T2 are linked directly to one another by a (third) cylindrical intermediate ring segment T3 of axial height $H_{T3}$ which is axially interposed between said first and second ring segments T1, T2 and forms relative to the central axis (XX') a throttle 10 which ensures a transition from a second ring segment T2 which is wider than the first ring segment T1 to a first ring segment T1 which is more tightened on the central axis (XX') than the second ring segment T2.

Advantageously, the intermediate segment T3 physically ensures the offset, both axially and radially, from the first segment T1 relative to the second segment T2, and consequently the separation of the first and second interference areas Z1, Z2.

As an indication, and in particular for a ring having diameters comprised between 70 mm and 100 mm, as described above, the axial height $H_{T3}$ of the intermediate segment T3 may be substantially comprised between 2 mm and 10 mm, whereas the axial height $H_{T1}$ of the first segment T1 may be substantially comprised between 5 mm and 15 mm, and the axial height $H_{T2}$ of the second segment T2 which may possibly be substantially equal to the axial height $H_{T1}$ of the first segment, be substantially comprised between 5 mm and 15 mm.

According to a possible embodiment, the respective axial heights $H_{T1}$, $H_{T2}$, $H_{T3}$ of the first segment, of the second segment and of the intermediate segment may be substantially equal: $H_{T1}=H_{T2}=H_{T3}$.

The total axial height H3 of the ring 3 may, in turn, be substantially comprised between 15 mm, or even 20 mm and 30 mm or even 40 mm, and preferably substantially equal to 25 mm.

The aforementioned axial heights will be advantageously chosen, on the one hand, so as to provide a good axial seat to the ring 3, and more particularly to provide a wide axial extent to the interference areas Z1, Z2, allowing to offer a clamping force (and a friction) of the ring 3 on each part 1, 2 which is high but distributed over a large surface, so as to limit the stresses in the parts 1, 2, below a predetermined permissible stress threshold (typically below the elastic limit $Rp_{0.2}$ of said parts 1, 2), while preserving, on the other hand, a good axial compactness to the ring 3 in order to reduce the overall dimension of the assembly.

The spatial transition performed by the intermediate segment T3 is advantageously progressive, said intermediate segment T3 having an arrangement generally inclined relative to the central axis (XX'), so that it converges progressively towards the central axis (XX'), in order to create a progressive constriction of both the inner face 3I and the outer face 3E of the ring 3 when said central axis (XX') is traversed from the second segment T2 toward the first segment T1.

Preferably, as can be clearly seen in FIGS. 3, 4 and 6, the intermediate segment T3 has a profile section, considered as a longitudinal section plane PL containing the central axis (XX'), which is in a substantially flattened S-shape, and which for this purpose has a greater inclination relative to the central axis (XX'), and therefore a more rapid convergence, in its axially central portion T3C and in its axially end portions T3A, T3B, at which the junctions with the first segment T1 and the second segment T2 take place respectively.

The first segment T1 and the second segment T2 preferably connect substantially tangentially to the axial end of the intermediate segment T3A, T3B which corresponds thereto.

It will be noted moreover on the profile section of the ring 3 two particular points, called «swivel points», R1, R2.

The first swivel point R1, located on the inner face 3I of the ring 3, corresponds to the junction between the first axial end T3A of the intermediate segment T3 and the first segment T1. It is around this first swivel point R1 that the bending deformation of the first segment T1 takes place (by moving away radially, during mounting), relative to the intermediate segment T3 under the stress of the first part 1 which penetrates into the ring 3.

Said first swivel point R1 can also advantageously correspond to the point of passage (and therefore to the radius) of the first cylindrical gauge surface C1.

The second swivel point R2, situated on the outer face 3E of the ring 3 corresponds to the junction between the second axial end T3B of the intermediate segment T3 and the second segment T2. It is around this second swivel point R2 that the bending deformation of the second segment T2 occurs (by moving closer radially, during mounting), relative to the intermediate segment T3, under the stress of the second part 2.

Said second swivel point R2 may also advantageously correspond to the point of passage (and therefore to the radius) of the second cylindrical gauge surface C2.

In practice, by convention, the total radial offset dR mentioned above will advantageously correspond to the radial distance separating the first swivel point R1 from the second swivel point R2 (and therefore the first gauge surface C1 from the second gauge surface C2).

Preferably, at least before the engagement of the assembly ring 3 on the first part 1, that is to say, when the initial ring 3 is considered at rest, before the first segment T1 is forced to be deformed in order to conform to the shape of the first part 1, as illustrated in FIGS. 3 and 6, the functional face of the first segment T1, here the radially inner face of the first ring segment $3I_{T1}$ intended to receive the first part 1, has a substantially frusto-conical shape which converges towards the central axis (XX') in the direction opposite to the second ring segment T2 (that is to say that the fictitious apex, preferably located on the central axis (XX'), of the truncated cone formed by the radially inner face of the first ring segment $3I_{T1}$, is outside the axial range H3 covered by the ring 3, and on the side of the first segment, that is to say axially closer to the first segment than to the second segment).

The radially inner face of the first ring segment $3I_{T1}$ thus converges towards the central axis (XX'), by being slightly folded towards said central axis (XX'), according to an angle called «closing angle», θ1 which is preferably substantially comprised between 0.5 degrees and 2 degrees, or even 4 degrees, and which is preferably substantially equal to 1 degree.

The clamping force of the first part 1 can advantageously be adjusted by the choice of the closing angle θ1.

Indeed, the higher said closing angle θ1, that is to say the more the inclination of the first segment T1 is high and convergent relative to the central axis (XX'), the greater the clamping of the first part 1, and the greater the capacity of the ring 3, and more particularly of the first segment T1, to compensate for the dimensional variations due to temperature changes.

On the contrary, the smaller the closing angle θ1, the less the stresses exerted in the part 1 (and in the ring 3) will be high.

It should be noted that the orientation of the truncated cone formed by the radially inner face of the first ring segment $3I_{T1}$, that is to say here a convergent orientation which tends to bring said radially inner face $3I_{T1}$ closer to the central axis (XX') as we go axially downwards along the ring 3, from upstream 3B to downstream 3A, from the upper axial end formed by the second segment T2 to the second lower axial end formed by the first segment T1, is preferably such that it coincides with the introduction direction F1 (here from top to bottom in FIGS. 1 and 4), in which the first part 1 is introduced into the ring 3 during the mounting.

In other words, the inner face of the first ring segment $3I_{T1}$, and more generally the inner face $3I$ of the ring 3 as a whole, forms against the first part 1, upon the introduction of said first part 1 into said ring 3, a kind of funnel, whose first part 1 will progressively, as its axial depression in the ring 3, and more particularly as its axial depression in the first segment T1, force the radial (centrifugal) spacing of the wall by corner effect.

This funnel shape advantageously facilitates the centering and the penetration of the first part 1 into the ring 3, homogenizes the distribution of the stresses about the central axis (XX'), and allows obtaining a deformation, in particular a very gradual and relatively homogeneous plastic deformation, of the ring 3, as the first part is depressed.

Furthermore, such a frusto-conical arrangement improves the non-return capacity of the ring 3, that is to say the capacity of the ring 3 to retain the part 1 against an axial extraction force which tends to pull the part 1 in the direction opposite to the introduction direction F1.

Furthermore, preferably, the radially outer face of the first segment $3E_{T1}$ also follows a frusto-conical convergence, according to the same closing angle θ1.

This «pointed» outer configuration can in particular facilitate the introduction and the centering of the ring 3 in the second part 2.

It should also be noted that, although it is not excluded that the radially inner face $3I_{T1}$ of the first segment T1 has a slightly curved frusto-conical shape, and in particular domed towards the outside, said radially inner face $3I_{T1}$ of the first segment T1 will preferably follow a rectilinear truncated cone, generated by a line segment which is inclined relative to the axis central (XX') of a value corresponding to the closing angle θ1.

Said line segment will preferably extend from the aforementioned first swivel point R1 to the free axial end (here the lower end) of the first segment T1.

For analogous reasons, it is also (or alternatively) possible to provide for a frusto-conical arrangement of the functional face of the second segment T2 and more generally of the second segment T2 as a whole.

Thus, preferably, at least before the engagement of the assembly ring 3 on the second part 2, that is to say when the initial ring 3 is considered at rest, before the second segment T2 is forced to be deformed in order to conform to the shape of the second part 2, as illustrated in FIGS. 3 and 6, the functional face of the second segment T2, here the radially outer face $3E_{T2}$ of the second ring segment T2, intended to receive the second part 2, has a substantially frusto-conical shape which diverges from the central axis (XX') in the direction opposite to the first ring segment (T1), according to an angle called «opening angle», θ2 which is preferably substantially between 0.5 degrees and 2 degrees, or even 4 degrees, and which is preferably substantially equal to 1 degree.

Here again, the higher said opening angle θ2, that is to say the more the second segment T2 flares along the central axis (XX') by moving away from the first segment T1, the greater the clamping of the second part 2, the greater the capacity of the ring 3, and more particularly the capacity of the second segment T2, to compensate for the dimensional variations due to the temperature changes.

Preferably, the truncated cone formed by the radially outer face $3E_{T2}$ of the second segment is, here again, rectilinear and is generated in this case by a line segment which is derived from the second swivel point R2 and oriented towards the second axial end (here the upper end) of the ring 3.

Preferably, the direction of convergence of the truncated cone formed by the radially outer face of the second segment $3E_{T2}$ (the convergence towards the central axis (XX') taking place here in the direction of the first segment) will coincide with the introduction direction F2 according to which the ring 3 is introduced into the second part 2, which will allow to obtain, as before, an effect of self-centering, distribution of the clamping stresses, and of progressive increase in the clamping stresses as the axial depression of the ring 3 in the second part 2.

In a particularly preferred manner, the introduction direction F2 according to which the ring 3 is introduced (preferably firstly) into the second part 2, and the introduction direction F1 in which the first part 1 is introduced (preferably thereafter) into the ring 3 (preferably previously positioned in the second part 2) are identical, the assembly being thus carried out advantageously always in the same direction (here from top to bottom).

Concretely, this means that the two truncated cones formed respectively by the first segment T1 and by the second segment T2 point in the same direction (here downwards).

This identity of the introduction directions F1, F2 allows in particular not to alter, during the insertion of the first part 1, the clamping already carried out between the ring 3 and the second part 2.

Furthermore, the radially inner face of the second segment $3I_{T2}$ follows also preferably a frusto-conical convergence, oriented towards the first segment T1, according to the same opening angle θ2 as the radially outer face of said second segment.

In this way, the inner face of the second segment $3I_{T2}$ will advantageously form a funnel which allows the first part 1 to be guided and centered upstream of the first segment T1 during the introduction of said first part 1 within the ring 3.

This «guiding and centering», funnel formed by the second segment T2 is then prolonged axially by the funnel formed by the throttle of the intermediate segment T3 and then by the «clamping» funnel formed by the first segment T1.

It should be noted that, finally, the assembly ring 3 has preferably an overall funnel shape, from upstream 3B to downstream 3A, the inner face 3I as well as the outer face 3E of the ring 3 (that is to say more generally the side wall of the ring 3) narrowing continuously, that is to say continuously moving closer to the central axis (XX'), as said ring 3 is axially traversed from upstream 3B to downstream 3A, over the entire axial height H3 of the latter.

Such a funnel conformation facilitates and improves not only the successive engagements of the parts 1, 2 on the ring 3 (and more particularly the engagement of the second part 2 around the ring 3 then the ring 3 around the first part 1, on the outer envelope of the latter), but also allows the manufacture of said ring 3 by stamping (or even by molding), thanks to the relief angles created by the opening and closing angles, and the throttle of the intermediate segment T3.

In a particularly preferred manner, the ring 3 is entirely integrally formed.

Thus, the second segment T2 is integrally formed with the first segment T1 and with the intermediate segment T3 in the same material.

Preferably, each of the first ring segment T1 and second ring segment T2, and preferably the assembly ring 3 as a whole, is integrally formed in a ductile material which has an elongation at rupture A % equal to or greater than 30%, and preferably equal to or greater than 38%.

The ring 3 will thus have an excellent plastic deformation capacity, which can be useful both for its manufacture by stamping and for its clamping (where appropriate its shrink-fit) without rupture on the parts 1, 2.

Similarly, the material selected to form the ring 3 (integrally) will preferably have an elastic limit of 0.2% (that is to say corresponding to 0.2% of permanent deformation) $RP_{0.2}$ equal to or greater than 140 MPa.

Preferably, at least the first ring segment T1, and preferably the assembly ring 3 as a whole, is integrally formed in a material whose coefficient of thermal expansion is comprised between 80% and 120%, and preferably between 90% and 110%, or even between 95% and 105%, of the coefficient of thermal expansion of the material constituting the first part.

In other words, the material constituting the ring 3 will be preferably chosen so that its coefficient of thermal expansion is as close as possible (by less than 20%, less than 10% or even less than 5%) to the coefficient of thermal expansion of the first part 1 and more generally to the smallest coefficient of thermal expansion of the two parts 1, 2.

Such a choice will advantageously allow the ring to follow spontaneously without significantly modifying its clamping, the thermal expansions of the first part 1. There will therefore be greater freedom as regards the range of allowable dimensional tolerances during the initial mounting of the ring 1 on said part 1.

Preferably, the assembly ring 3 is integrally formed from a metallic material, preferably a steel.

Such a material is, indeed, relatively cheap, simple to shape, and has the qualities of strength and desired ductility.

In particular, it is possible to use a non-coated strap type, cold-rolled and mild steel material for cold forming, more particularly a DC04+LC grade according to the standard NF EN 10139.

Preferably, as illustrated in FIGS. 4 to 6, the assembly ring 3 includes, at its free axial end located on the side of the second segment T2, a collar 11 projecting radially outwards.

Said collar 11 advantageously forms a radially outer rim which follows the perimeter of the ring, preferably circular rim, and which extends substantially according to a plane normal to the central axis (XX'), projecting on the radially outer face $3E_{T2}$ of the second segment T2, quasi-perpendicularly to said face.

The collar 11 may advantageously fulfill (alternatively or cumulatively) two functions.

Firstly, a first «anti-ovalization» function according to which the collar 11 stiffens the ring 3, and thus prevents said (circular) ring from being deformed or crushed radially in a heterogeneous manner, and therefore from being ovalized, in particular during manipulations which occur before the mounting of the parts 1, 2 or during the manufacture by stamping of the ring 3, when said ring is carried out by stamping an anisotropic material such as a rolled steel.

Thereafter, a second (axial) stop function, according to which the collar 11 cooperates with a shoulder 12 provided on the second part 2, and more particularly in the housing 4, which shoulder 12, which forms a stop rim which reproducibly, accurately and stably limits the axial penetration of the ring 3 into the second part 2, during the introduction of the ring 3 into the second part 2, then during the introduction of the first part 1 into the ring 3.

Preferably, as illustrated in FIG. 7, the assembly ring 3 is integrally manufactured by a stamping method, during which a blank 13 is stamped so as to form a cylindrical stamping crude 14 whose axis corresponds to the central axis (XX') and whose side wall 15 has the final shape of the assembly ring 3.

Preferably, the bottom 16 of the stamping crude 14 is then cut, preferably by punching, according to the cutting line 20 illustrated in FIG. 7, so as to preserve only the side wall portion 15 of the stamping crude which corresponds to the shape and dimensions of the desired assembly ring 3.

Depending on the case, it will be possible either to leave the collar 11 in order to obtain a ring according to FIGS. 4 to 6 or to withdraw the upper portion of the stamping crude 14 containing the collar 11 in order to obtain a «right» end ring according to FIGS. 1 to 3.

Advantageously, the side wall 15 of the stamping crude 14, and therefore the side wall of the ring 3, will have a relief structure which generally converges towards the central axis, and which successively includes, in this order along the central axis (XX'), and radially concentrically embedded, the optional collar 11, the second large segment T2, the intermediate segment T3, and then the first narrow segment T1 (to which the bottom 16 is initially attached).

According to a possible implementation option, the method comprises a packing step (d) during which there is interposed between, on the one hand, the radially outer face $3E_{T1}$ of the first ring segment T1 (that is to say on the face opposite to that against which the first part 1 bears) and, on the other hand, a portion of the second part 2 which axially overlaps said radially outer face of the first segment, typically a portion of the wall of the housing 4, at least one thermal dissipation member 17, of the thermal paste joint type, which forms a thermal bridge between the assembly ring 3 and the second part 2 to promote the evacuation of heat from the first part 1 to the second part 2, and/or at least one damping member 18 made of elastomer, of the kind pad or annulus (for example an O-ring) intended to damp the transmission of vibrations between the first part 1 and the second part 2.

As illustrated in FIGS. 1 and 4, the heat dissipation member 17 and/or the damping member 18 will be advantageously located in the first clearance space 7 provided by construction, which will allow the assembly to preserve its compactness.

Of course, the heat dissipation member 17 and/or the damping member 18 will be more flexible, and therefore more easily deformable, than the ring 3 and the second part 2, in particular by creep under radial compression, so as not to constitute an obstacle to the deformations, and in particular to the expansions, of the ring 3 and of the second part 2.

The heat dissipation member 17 and/or the damping member 18 may in particular be joined to the ring 3, on the outer face $3E_{T1}$ of the first segment T1 before the ring 3 is introduced into the housing 4 of the second part 2 in such a way that the heat dissipation member 17 and/or respectively the damping member 18 is radially compressed between the ring 3 and the second part 2, in direct contact therewith.

Of course, the invention also concerns as such a sub-assembly comprising a case 2, in particular a steering case, containing a motor 1, in particular a steering assist motor, fastened to said case 2 by means of an assembly ring 3 according to the invention, as well as a power steering device comprising such a sub-assembly, as well as a vehicle equipped with such a power steering device.

In particular, the invention therefore concerns a power steering device comprising at least one assist motor 1, which preferably has a steel envelope, as well as a steering case 2, preferably made of an aluminum alloy or a magnesium alloy, which is provided with at least one housing 4 in which the assist motor 1 is fastened, said power steering device being characterized in that the fastening of the assist motor 1 in the housing (4) of the steering case 2 is carried out, preferably exclusively (because a single assembly ring 3 according to the invention can be advantageously sufficient to fasten in a solid and stable manner the first part 1 to the second part 2, and more particularly a motor 1 on and in a steering case 2), by means of an assembly ring 3 implemented according to the method in accordance with the invention, according to any one of the variants described in the foregoing.

Furthermore, the invention also concerns as such an assembly ring 3 according to any one of the embodiments described in the foregoing, as well as the use of such a ring 3 to fasten by clamping a first part, and in particular a motor 1, on a second part, and in particular a case 2.

Of course, the invention is not limited to the sole embodiments mentioned above, the person skilled in the art being likely in particular to freely isolate or to combine together either or both of the characteristics described above, or to substitute them with equivalents.

In particular, the conformation of the assembly ring 3 can be subject to variants in order to adapt to the parts 1, 2 to be assembled.

Similarly, the application of the assembly method may extend to the fastening of motors in cases within devices other than power steering.

The invention claimed is:

1. An assembly method for fastening a first part to a second part, the method comprising:
   interposing a cylindrical assembly ring between the first part and the second apart, the cylindrical assembly ring having a central axis, a radially inner face and a radially outer face, the assembly ring having a first ring segment axially stepped relative to a second ring segment along the central axis, the first ring segment having dimensions different from the second ring segment in a section normal to the central axis;
   press-fitting the radially inner face of the assembly ring on the first part to form a first clamping contact between the first part and the assembly ring, which secures the first part and the assembly ring, the first clamping contact occupying a first interference area on the radially inner surface of the assembly ring; and
   press-fitting the radially outer face of the assembly ring on the second part to form a second clamping contact between the second part and the assembly ring, which secures the second part and the assembly ring, the second clamping contact occupying a second interference area on the radially outer surface of the assembly ring, and the first interference area and the second interference area being confined to the respective first ring segment and second ring segment such that the first interference area does not overlap with the second interference area.

2. The method according to claim 1, further comprising pressing the assembly ring against the first part in the first interference area and pressing the assembly ring against the second part in the second interference area so as to cause a plastic deformation of the assembly ring.

3. The method according to claim 1, wherein the assembly ring has an axisymmetric shape about the central axis or the assembly ring forms a closed annulus having a continuity of material entirely around the central axis.

4. The method according to claim 1, further comprising tightening the press-fitting of the first ring segment along the central axis more than the press-fitting of the second ring segment so that a radially inner face of the first ring segment is radially closer to the central axis than a radially inner face of the second ring segment and, respectively, a radially outer face of the first ring segment is radially closer to the central axis than a radially outer face of the second ring segment.

5. The method according to claim 1, wherein the first ring segment forms a first axial end of the assembly ring, or the second ring segment forms a second axial end of the assembly ring, opposite the first axial end.

6. The method according to claim 4, wherein the first ring segment and the second ring segment are linked directly to one another by a cylindrical intermediate ring segment interposed axially between the first and second ring segments, the cylindrical intermediate ring segment forming a throttle relative to the central axis, the throttle ensuring a transition from the second ring segment to the first ring segment.

7. The method according to claim 4, wherein at least before press-fitting the assembly ring on the first part, the radially inner face of the first ring segment has a frusto-conical shape converging towards the central axis in a direction opposite to the second ring segment, according to a closing angle.

8. The method according to claim 4, wherein at least before press-fitting the assembly ring on the second part, the radially outer face of the second ring segment has a frusto-conical shape diverging from the central axis in a direction opposite to the first ring segment.

9. The method according to claim 1, wherein each of the first ring segment and second ring segment are integrally formed of a ductile material having an elongation at a rupture equal to or greater than 38%.

10. The method according to claim 1, wherein at least the first ring segment is integrally formed of a material having a coefficient of thermal expansion between 80% and 120% of a coefficient of thermal expansion of a material constituting the first part.

11. The method according to claim 1, wherein the assembly ring is integrally formed of a metallic material.

12. The method according to claim 1, wherein the assembly ring includes, at a free axial end of the assembly ring situated on a side of the second segment, a collar projecting radially outwards.

13. The method according to claim 1, wherein the assembly ring is integrally manufactured by a stamping method including:
   stamping a blank to form a cylindrical stamping crude having an axis corresponding to the central axis and a side wall with a final shape of the assembly ring, and
   cutting a bottom of the stamping crude to preserve only the side wall of the stamping crude corresponding to the final shape and dimensions of the assembly ring.

14. The method according to claim 1, further comprising a packing step including:
   interposing at least one thermal dissipation member composed of a thermal paste between a radially outer face of the first ring segment and a portion of the second part which axially overlaps the radially outer face of the first ring segment to form a thermal bridge between the assembly ring and the second part, the at least one thermal dissipation member promoting evacuation of heat from the first part to the second part, or
   interposing at least one damping member made of an elastomer between the radially outer face of the first ring segment and the portion of the second part which axially overlaps the radially outer face of the first ring segment to damp transmission of vibrations between the first part and the second part.

15. A power steering device comprising at least one assist motor having a steel envelope and a steering case made of an aluminum alloy or a magnesium alloy, the steering case including at least one housing fastened to the assist motor, wherein fastening of the assist motor in the housing of the steering case is carried out according to the method of claim 1.

\* \* \* \* \*